United States Patent [19]

Fascenda

[11] Patent Number: 4,677,434
[45] Date of Patent: Jun. 30, 1987

[54] ACCESS CONTROL SYSTEM FOR TRANSMITTING DATA FROM A CENTRAL STATION TO A PLURALITY OF RECEIVING STATIONS AND METHOD THEREFOR

[75] Inventor: Anthony C. Fascenda, Pacifica, Calif.

[73] Assignee: Lotus Information Network Corp. (formerly Data Speed, Inc.), San Mateo, Calif.

[21] Appl. No.: 662,251

[22] Filed: Oct. 17, 1984

[51] Int. Cl.$^4$ ............................................... H04Q 1/00
[52] U.S. Cl. ................................. 380/23; 340/825.27; 340/825.31; 340/825.26; 380/43
[58] Field of Search ................. 340/825.26–825.34, 340/825.44–825.48, 311.1, 825.52, 825.53, 825.69, 825.72; 178/22.01, 22.08, 22.1; 179/1.5 S, 2 EC; 455/89

[56] References Cited

U.S. PATENT DOCUMENTS

| | | | |
|---|---|---|---|
| 3,387,268 | 6/1968 | Epstein | 340/825.26 |
| 3,611,294 | 10/1971 | O'Neill et al. | 340/825.26 X |
| 4,070,693 | 1/1978 | Shutterly | 179/1.5 S X |
| 4,176,321 | 11/1979 | Horn | 179/1.5 S X |
| 4,323,881 | 4/1982 | Mori | 340/825.48 |
| 4,410,911 | 10/1983 | Field et al. | 179/1.5 S X |
| 4,473,824 | 9/1984 | Claytor | 340/825.27 |

*Primary Examiner*—Ulysses Weldon
*Attorney, Agent, or Firm*—Flehr, Hohbach, Test, Albritton & Herbert

[57] ABSTRACT

An apparatus and a method of providing an access control for transmitted stock market data from a central radio station to a plurality of one-way radio receivers. Into each receiver is inputted an access code including a cypher pointer which provides for scrambling of the remainder of the access code which includes the authorized services, the service cutoff date, and the unit serial number which is unique to a particular receiver. The cypher pointer is used to rotate a common map in the receiver used for unscrambling and in the central station used for scrambling. In order to receive service, the permanently stored serial number of the unit must compare with the serial number of the access code, the cutoff date must be greater than the present system date transmitted from the central station, and there must be an authorized service class.

9 Claims, 10 Drawing Figures

ACCESS CONTROL SYSTEM FOR TRANSMITTING DATA FROM A CENTRAL STATION TO A PLURALITY OF RECEIVING STATIONS AND METHOD THEREFOR

BACKGROUND OF THE INVENTION

The present invention is directed to an access control system for transmitting data from a central station to a plurality of receiving stations and method therefor and more specifically to a system where the transmitted data is real time stock market quotations.

The transmission of proprietary data to several receiving stations or users via either wire or radio entails security problems. That is, if the user is to be charged for the information, there must be some technique for preventing its free reception. Thus, in pay television the signal is scrambled and a decoder is provided which is attached to the user's television receiver. Billing information may be based on a flat rate per month basis or per program use where the use is monitored either by a two-way transmission over the cable or by periodic visits to the home.

Where the device to receive information, for example, stock quotations is a small portable hand-held radio receiver unit, the smallness and portability of the receiver make it difficult to adopt the same kind of system as is used, for example, for pay television. Thus, it is an object of the present invention to provide an improved access control system and method therefor for transmitting data from a central station to a plurality of receiving stations especially where the receiving stations are of the portable hand-held radio receiver type.

In accordance with the above objects, there is provided an access control system for transmitting data from a central station to a plurality of receiving stations. Each of the receiving stations comprises first memory means for permanently storing a unique serial number. A second temporary memory means stores an access code which includes in scrambled form the serial number, a service cutoff date, and also includes a cypher pointer. Map means are responsive to this cypher pointer for unscrambling the scrambled serial number and cutoff date. Finally, there are means for comparing the unscrambled serial number with the permanently stored serial number for validating each receiving station.

A corresponding method includes the steps of using a common map at both the central station and all of the receiving stations for scrambling the bits of an access code at the central station and unscrambling such bits at the receiving station. Each receiving station is provided with a unique serial number which is part of the access code. Permanently stored in each of the receiving stations is the serial number. This is compared with the serial number which is part of the access code after such code is unscrambled.

DESCRIPTION OF PREFERRED EMBODIMENT

Figures 1, 2:
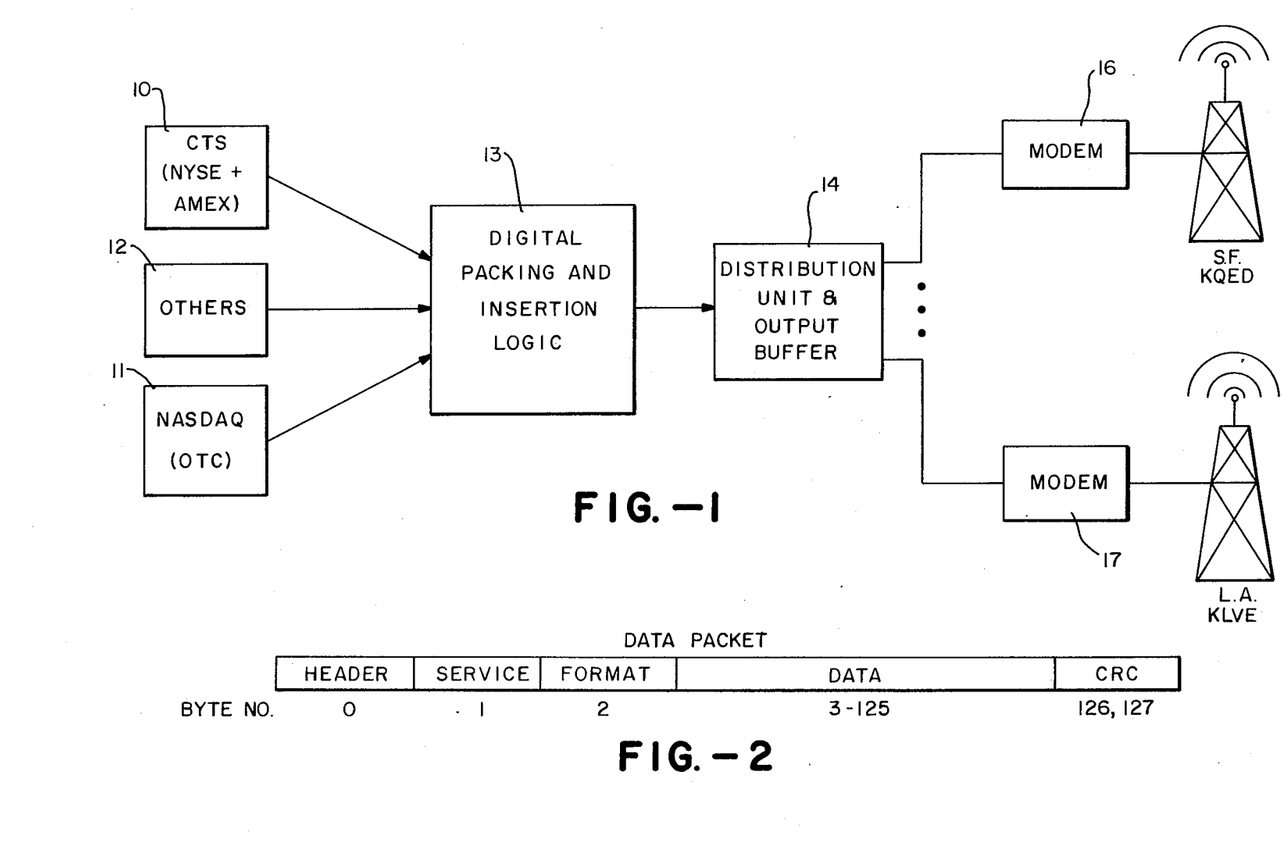
FIG. 1 is a block diagram illustrating the present invention.
FIG. 2 shows a packet of binary stock market data illustrating how it is transmitted.

Now referring in FIG. 1 which is the general system layout, stock data is received from various stock exchanges which include the CTS line in block 10 which consists of the New York Stock Exchange and the American Stock Exchange, NASDAQ in block 11 which is over-the-counter and others indicated in block 12 which are commodity exchanges such as Chicago Mercantile Exchange, Commodities Exchange Corporation and Chicago Board of Trade. In addition, general information such as sports, news and specifically market news can be transmitted. All of these sources of information would be connected normally by telephone line to a central headquarters where the data would be packaged as indicated by block 13.

As a typical example of the parameters being received on the CTS line 10, these would consist of the stock symbol (for example, RCA), the last or current price of the stock, the last volume, and the exchange (New York or American). This information is processed along with the other inputs and in digital format is sent to the distribution unit 14 which in turn is connected by modems 16 and 17 to two or more FM radio stations for transmission of the stock market data and other information on the FM SCA subcarrier channel. The two stations indicated are San Francisco, KQED and Los Angeles, KLVE.

As will be discussed later, there radio transmissions are picked up by hand-held battery powered pocket size FM receivers which are leased by customers interested in up-to-the-minute stock market data. The leasing is on a month-to-month basis and as will be discussed below every one to three months the customer is supplied with an access code which specifies the type of service to be received such as New York Stock Exchange, over-the-counter or other types of information and the period of time that the leasing period was contracted for.

The technique of transmitting and encoding the digital data is disclosed and claimed in a co-pending application in the name of ANTHONY C. FASCENDA, entitled METHOD OF ENCODING STOCK MARKET DATA AND TRANSMITTING BY RADIO TO A PLURALITY OF RECEIVERS, Ser. No. 598,694, filed Apr. 10, 1984, and assigned to the present assignee.

As described and illustrated in the above application, the information regarding a specific stock, for example the stock RCA requires for one format that fifty-six bits be transmitted. These bits are transmitted in the following manner. The stock symbol RCA uses a five bit binary code for each letter of the twenty-six letters in the alphabet; e.g., A is all zeros, with the twenty-six letters corresponding numerically from 0 through 25. Thus the complicated and larger character array of ASCII is avoided.

Next, the last sale price can be represented by 6 bits for the whole number of the sale price which means numbers equal or less than 64. Then the fraction is represented by a 3 bit binary number. Thus the 8ths from 0 through 7 correspond directly to the equivalent number of the 3 bit code. The remaining trading information is transmitted as offsets in the form of "open," "high" and "low". These are offsets from the last sale price. The open offset is signed and thus there is an extra one bit indicator for the negative sign. All of the offsets are 2 bits for indicating the decimal numbers 1, 2, 3 and then a further 3 bits are allocated for the 8ths indication.

In summary, the data of a particular stock is transmitted in the above bit form.

The configuration of the receiver which receives the data on the SCA channel of an FM station and converts it to a binary format, includes an FM receiver having an SCA phase locked loop which receives the SCA subcarrier signal and tracks it as it is swung between a plus or minus 3 KHz. The phase locked loop thus recreates the digital data which contains stock market information in the form of binary "1's and 0's". This is coupled to a central processing unit.

The digital data is encoded for transmission via the transmitting antenna of the FM radio station by the following technique. The digital data drives a voltage controlled oscillator which in essence provides a 70 KHz signal for all binary "1's" and a 64 KHz signal for all binary 0's. This is coupled via an adder circuit to the standard 67 KHz SCA subcarrier to provide a 67 KHz signal which has been frequency shifted plus or minus 3 KHz when data is being encoded on it. Thereafter the frequency shifted subcarrier signal drives the exciter and via the transmitter transmits the data to be picked up by the receiver.

FIG. 2 illustrates a packet of digital data which contains the stock market information and consists of 128 bytes each byte having 8 bits. As illustrated, the data packet includes a header which indicates the beginning of the packet, a service byte which indicates, for example, the New York Stock Exchange, American Stock Exchange, over-the-counter commodities, etc. Each service has a different identification code and the user, as will be discussed below, has the capability of subscribing to one or more of the services. The remaining bytes and the data and how encoding is accomplished is discussed more fully in the above FACENDA co-pending application.

Figure 3:
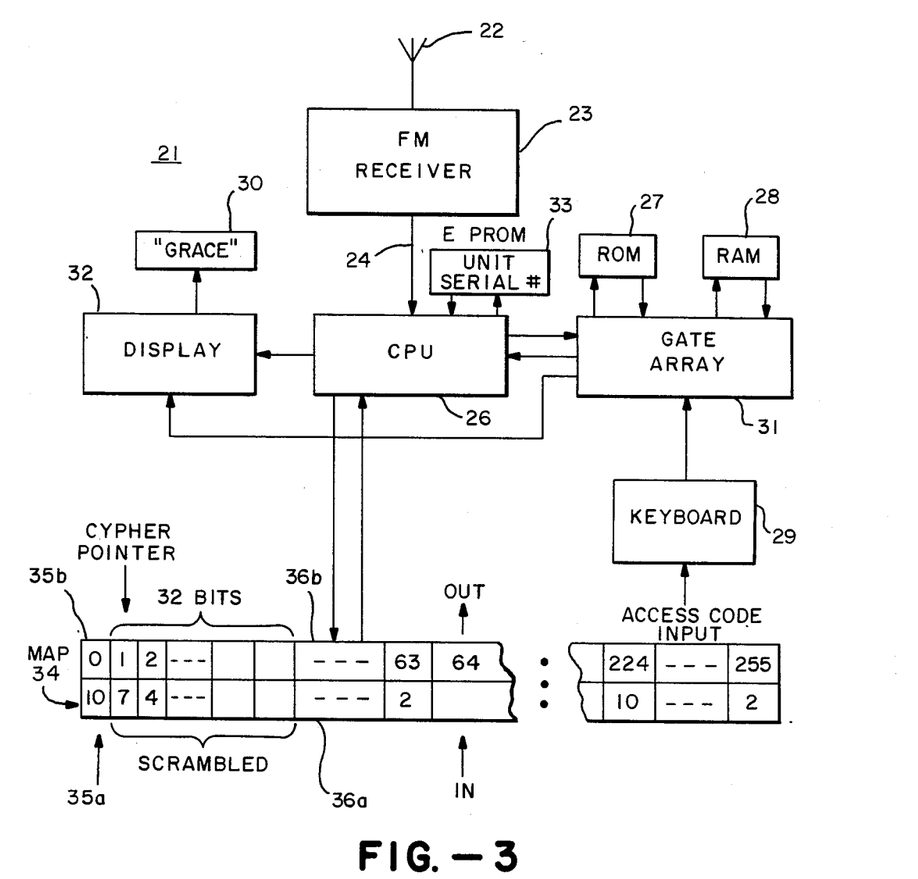
FIG. 3 is a block diagram of a receiver embodying the present invention.

FIG. 3 illustrates the receiving unit 21 for receiving the FM signal on an antenna 22, converting it from its FM format back to a digital format and transmitting this digital data on a line 24 to a central processing unit 26. Central processing unit 26 is typically a microprocessor receiving the data and manipulating it in accordance with instructions stored in read only memory 27. In addition, in the random access memory 28, are stored a portfolio of stocks which the user wishes to receive. Information may be inputted into the receiver 21 by means of keyboard 29 via the gate array 31 which couples all of the above-mentioned units to the CPU along with a display 32. Indicated as part of the display is a "grace" display 31 which indication is activated when the user's lease period has expired and they are in a 15 day grace period. At this time, the user must obtain a new access code from the central station or headquarters and input it via the keyboard 29 as is indicated.

Each receiver unit 21 also has a programmed read only memory (EPROM) unit 33 which contains the unique serial number of that particular receiver. Thus, it is permanently stored with a particular receiver. Finally, each receiver includes a map unit 34 (stored in ROM 27) which, as will be discussed below, is for the purpose of unscrambling the access code. From a functional standpoint, the map takes the first 32 scrambled bits of the access code and unscrambles them in accordance with the map structure. From a practical standpoint, this is done with the use of 8 pairs of 32 bit registers each of which is mapped in a similar manner as, for example, illustrated in the first register pair 35a, 35b where in the output portion 35b the bits are arranged in sequential order 0 through 31 and then the input side 35a they have been scrambled at random as partially indicated. Then the next register set 36b represents the bits 32 through 63 but on the input side 36a the same scrambled bit locations are indicated as in register 35a. This is true until the eighth register. Thus, the first 32 bits of this scrambled access code is inputted on the input side, that is, the "a" side labeled "IN" and exits on the "OUT" side or "b" in an unscrambled form. As part of the access code, a cypher pointer is provided which designates from 0 through 255 on the "b" side the starting point at which the first bit is inputted into the map. In this case, the starting point has been chosen as bit "1" in the first 35b register. Thus, in effect, the cypher pointer provides a rotation of the 32 bit map.

As will be discussed below, the user of eight pairs of map registers provides greater flexibility in the assignment of a cypher pointer which naturally may be assigned 0 through 255. It is also obvious that alternative systems of maps may be used including one which is purely in a programmed or software format.

Figure 5A:
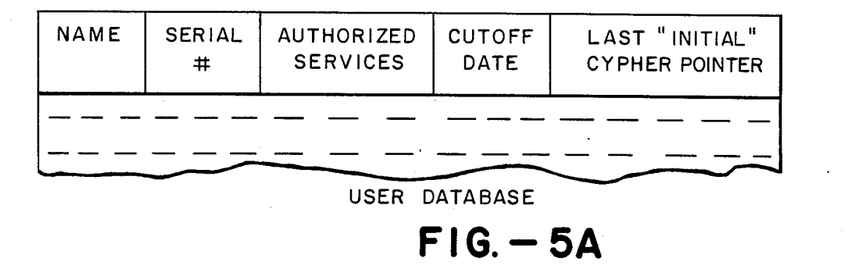
FIG. 5A illustrates the user data base stored in the central station.
Figure 5B:
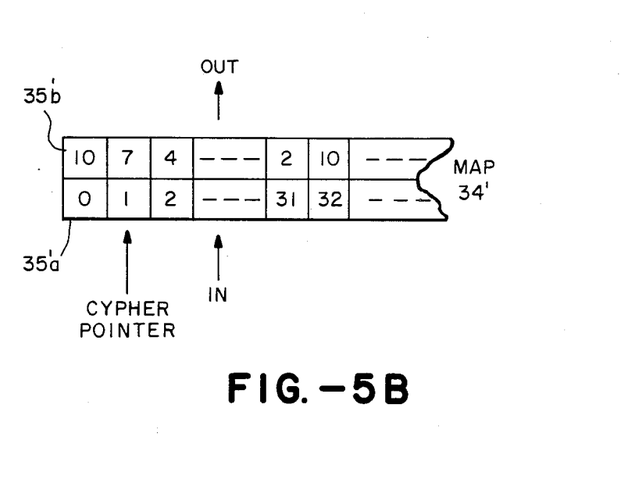
FIG. 5B illustrates a map which is in the central station.

Referring briefly to FIG. 5B, located in the central station (that is, where the digital packing and data insertion takes place as illustrated in FIG. 1) is an inverse of map 34 designated map 34'. Here since the purpose of this map 34' is for scrambling the access code information, the input occurs on a register 35'a and the output on registor 35'b. But in all other respects the common maps are, of course, identical or equivalent since they must be to successfully perform the scrambling and unscrambling function. In addition to the map 34', there is also located at the central station, the user data base of FIG. 5A and the master cypher pointer data base of FIG. 5C.

Figure 4:
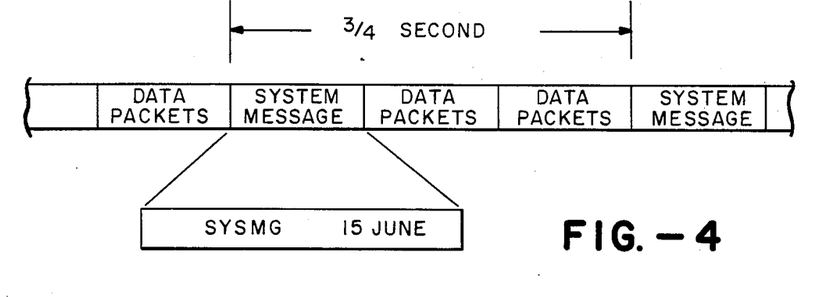
FIG. 4 illustrates the overall data stream as it is transmitted.

FIG. 4 illustrates the complete data stream from the central station of FIG. 1 which includes the data packets which are interspersed at, for example, ¾ second intervals (at 4800 baud) with system messages as indicated. This system message may contain any desired information as well as the current data which here is indicated as 15 June.

The user data base of FIG. 5A is in essence a type of index card which lists the name of the user, the serial number of the receiver which has been assigned to the user and which, by the way, is unique, the authorized services which the user has subscribed to as, for example, New York Stock Exchange, over-the-counter, commodities, etc., the cutoff date which is the future date to which the user has contracted to lease the receiver to validly receive the stock market information, and finally information indicated as a "last initial cypher pointer".

Figure 5C:
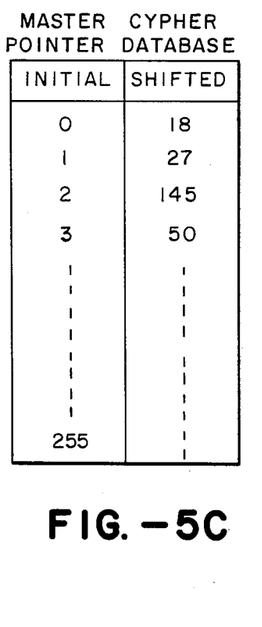
FIG. 5C illustrates a master data base which is in the central station.

The cypher pointer was discussed in conjunction with the maps 34 and 34' and is generated by the use of the master cypher pointer data base of FIG. 5C. When the user or customer first subscribes to the service, at random an initial cypher pointers is chosen, for example, from 0 through 255. But the actual cypher pointer used in the access code is taken from the "shifted" column. These are merely the numbers 0 through 255 rearranged randomly. The ultimate purpose of such shifting is to prevent any sequential or logically additive new cypher pointer being produced when the user's old cypher pointer expires. In other words, supposing the initial cypher pointer was "1", this prevents the assignment of, for example, the next cypher pointer "2" which would simplify the breaking of the access code system.

Figure 6:
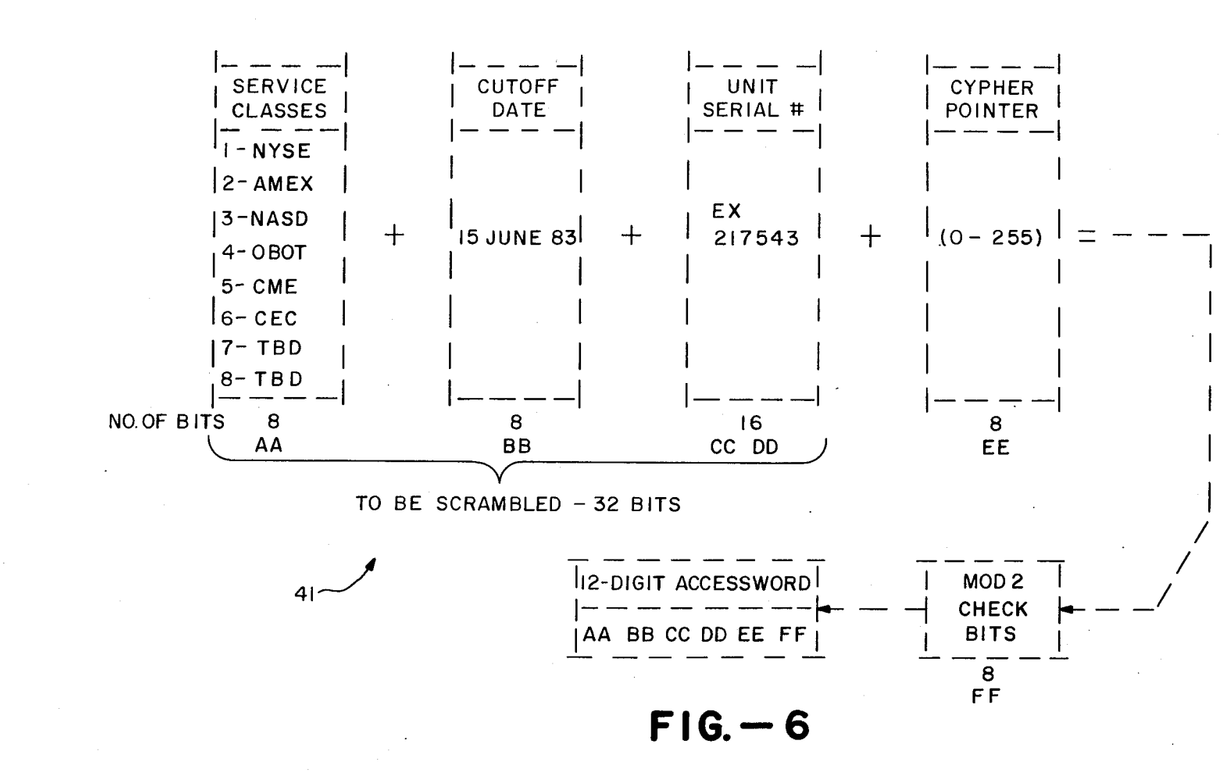
FIG. 6 illustrates symbolically how an access code is generated.

The actual bit configuration of the access code is illustrated in FIG. 6. The portion of the access code to be scrambled is indicated at 41 as consisting of 32 bits with the letters "A" through "D" indicating 4 bit nibbles. The letters "AA" designate the authorized service classes which include New York Stock Exchange, American Stock Exchange, over-the-counter (NASD), etc., along with the some unassigned services. The next 8 bits designated "BB" is the cutoff date and lastly the unit's serial number is represented by 16 bits or "CCDD".

Then in unscrambled format is the cypher pointer which is 8 bits represented by "EE" which can represent any number from 0 to 255. The first 32 bits are scrambled by use of the map 34′ of FIG. 5B as will be explained in detail later. The cypher pointer is appended and then Modulus 2 check bits designated by "FF" are attached. Then this is all assembled and given to the user as a 12 digit or 12 character access code for input into the temporary memory (e.g., RAM 28) of receiver 21 (FIG. 3). Such access code is unique to the user firstly because of the unit serial number and secondly because of the unique cypher pointer.

Figure 7:
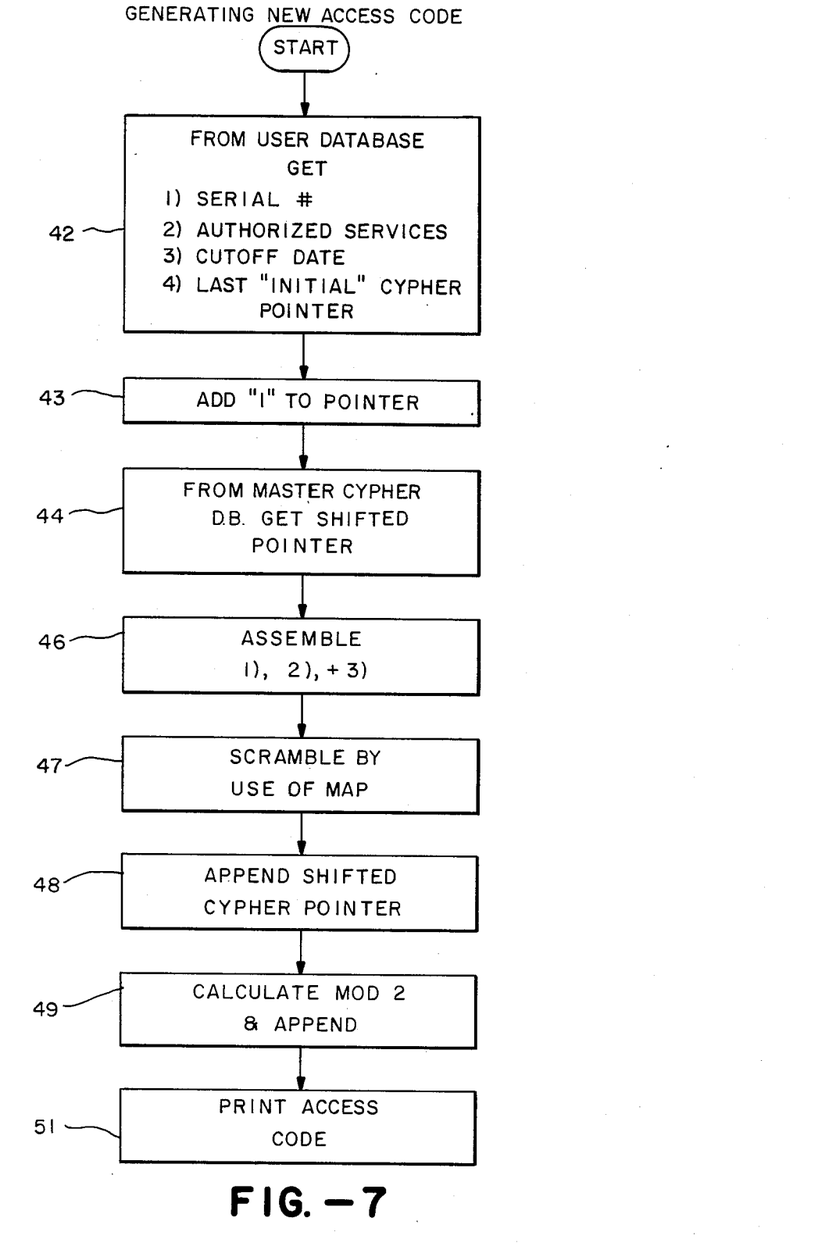
FIG. 7 is a flow chart showing the generation of the access code of FIG. 6.

The actual generation of the access code is shown by the flow chart of FIG. 7. This is done by software in accordance with the flow chart of FIG. 7 at the central station. Thus, after a start, the following information is gotten from the user data base of FIG. 5A.

(1) Serial Number.
(2) Authorized Services.
(3) Cutoff Date.
(4) Last Initial Cypher Pointer.

This is assuming that the customer's cutoff date or lease period is due to expire and, thus, they must be given a new access code to be inputted into their handheld receiver. All of this is done in block 42. In step 43, one is added to the old initial cypher pointer. Then in step 44, from the master cypher table of FIG. 5C, a new shifted pointer is selected. This ensures, as discussed above, a random selection of cypher pointers and not just an arithmetic progression. In step 46, there is assembled:

(1) The Serial Number unique to that user.
(2) The List of Authorized Services.
(3) The Cutoff Date.

Referring back to FIG. 6, this constitutes 32 bits of information. These 32 bits as indicated in step 47 are scrambled by the user of the map 34′ located at the central station. Moreover, this scrambling is determined by the particular cypher pointer which has been selected for that receiving station or user.

Next, in step 48, this cypher pointer is appended to the access code; in step 49, the modulo 2 error checking is appended and the final 12 digit or 12 character access code is printed in step 51 for delivery to the user. Then the user inputs via keyboard 29 (FIG. 3) this access code into their receiver.

Figure 8:
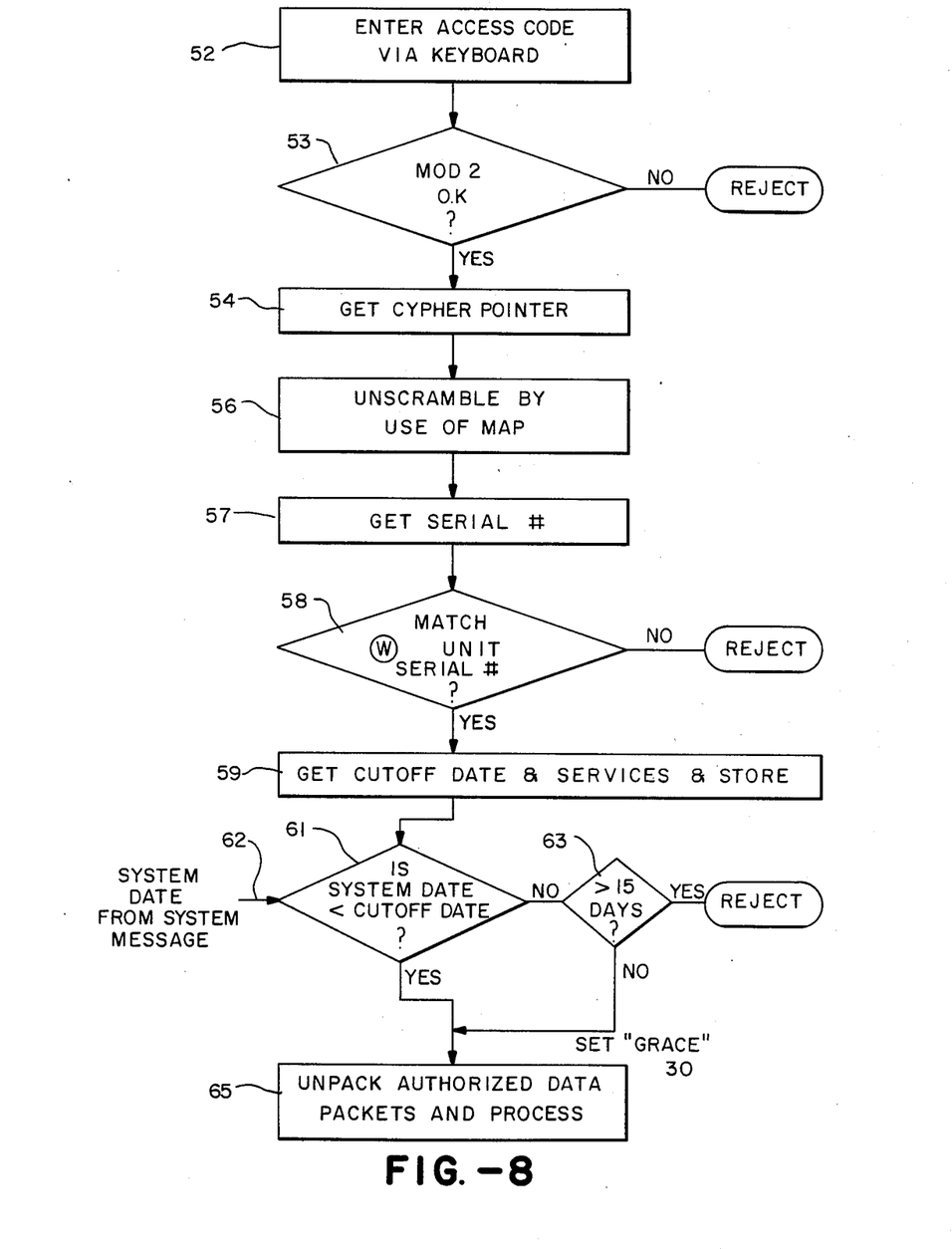
FIG. 8 is a flow chart illustrating the operation of one of the receiving stations of the present invention.

In FIG. 8, there is a flow chart indicating the process followed after entry of the access code via the keyboard as indicated in step 52. First, in step 53, the modulo 2 error checking code is verified to ensure that data has been inputted properly and no errors have occurred. Next, in step 54, the cypher pointer is gotten. Note referring to FIG. 6 this is not in scrambled form. Thus, it may be directly used in step 56 to unscramble the 32 bit scrambled portion of the access code. Specifically, referring to FIG. 3, the map 34 is utilized with the particular cypher pointer to determine the rotation on the map or the start of the unscrambling and thus the entire contents of the access code are now available for use. The unscrambling map 34 is, of course, just the inverse of the map 34′ at the central station and thus both may be said to be a common map which are common to all receiving stations and also the central station. A particular cypher pointer, however, is unique to that particular user especially due to the randomness produced by the master cypher table at the central station (FIG. 5C). This, thus, provides some differentiation between users even though the same map is utilized. Also, since a new cypher pointer was chosen on a random basis even with the same user, the new access code is significantly different than the old access code despite the fact that the unit serial number 33 (FIG. 3) has not changed.

Still referring to FIG. 8, this unit serial number is gotten in step 57 from the EPROM unit 33 and in step 58 a match is made with the serial number which has been unscrambled from the access code. If a match occurs, then in step 59 the cutoff date is gotten and stored within the RAM along with the list of authorized services. Upon receipt of data (step 61), this date is compared with the system date.

As discussed in conjunction with FIG. 4, the system date is transmitted at ¾ second intervals in uncoded or unscrambled format. Such system message input is indicated at 62. If the system date is not less than the cutoff date, then in step 63 the question is asked is it greater than 15 days, which is the grace period. If yes, then no validation occurs and a reject function occurs meaning that no stock market data can be received. If it is within the 15 day period, then the grace indicator 30 of FIG. 3 is set indicating to the user that they are within the grace period and services activated or turned on is indicated in step 65. Of course, if the system date is less than the cutoff date, step 65 is gone to immediately from step 61.

Authorized data is then unpacked and processed in accordance with the above co-pending FACENDA application.

In summary, since each receiving station has its unique serial number, the matching of serial numbers is a significant technique to differentiate one user from another. This is true even though they have a common map. The cypher pointer which is also substantially unique to the user, since there are 256 available, is another way of differentiating one user from the other.

Also, since the master cypher pointer table randomly generates a shifted cypher pointer when the monthly or tri-monthly lease period has expired, this means that one user will in all probability not receive the same cypher pointer more tha once.

The access code system also provides an easy technique for validating a receiving station and in essence turning on its service without requiring expensive password systems or two-way communication systems.

The present invention also allows for authorized services to be easily added or terminated since the list of authorized services is part of the scrambled portion of the access code and can easily be changed. Also, the list of authorized services is an integral part of the unit serial number which must also be validated.

Additionally, the system is self *"dunning"*. The user is automatically reminded when his bill is not paid as his current access code becomes "stale". The "GRACE" indicator "duns" the owner that his subscription is about to run out.

Thus, an improved access system and method therefor for the transmission of data from a central station to a plurality of stations has been provided.

What is claimed:

1. An access control system for transmitting data from a central station to a plurality of receiving stations each of said receiving stations each of said receiving stations comprising:
   first memory means for permanently storing a unique serial number;
   second temporary memory means for storing a manually inputted access code including in scrambled form said serial number and a service cutoff and also including a cypher pointer which is not scrambled;
   map means responsive to said cypher pointer for unscrambling said scrambled serial number and cutoff date; and means for comparing said unscrambled serial number with said permanently stored serial number for validating said receiving station to allow such station to receive said transmitted data.

2. A system as in claim 1 where said cypher pointer of said access code is related to and determines the scrambled form of said access code.

3. A system as in claim 1 including means for receiving a system date from said central station and for comparing with said cutoff date for terminating operation of said receiver.

4. A system as in claim 1 including means at said central station for randomly generating a new cypher pointer when said cutoff date is reached for a receiving station said central station also having map means, equivalent to said map means at said receiving stations, which is responsive to said new cypher pointer for generating a new access code for such receiving station which is substantially different than a previous or old access code.

5. A process of access control for a system of transmitting data from a central station to a plurality of receiving stations using equivalent maps at said central station and all of said receiving stations for scrambling the bits of an access code at the central station and unscrambling at the receiving stations comprising the following steps:
   permanently storing in each receiving station a unique serial number;
   providing an access code which includes said unique serial number;
   scrambling at least a portion of said access code by use of said map at said central station;
   manually inputting said scrambled access code into a receiving station having a corresponding serial number; unscrambling said inputted scrambled access code by use of said map in said receiving station;
   comparing, in said receiving station said permanently stored number with the serial number which is part of said unscrambled access code;
   and if a comparison occurs allowing said receiving station to receive said data.

6. A process as in claim 5 where said access code includes an individualized cypher pointer which is not scrambled and including the step of using said pointer to rotate said maps of said central station and said receiving station both for scrambling and unscrambling.

7. A process as in claim 6 including the steps of randomly generating a new cypher pointer for the access code of a receiving station when a billing period of a predetermined plurality of days has expired, scrambling said access code by use of said pointer and said map at said central station, and storing said scrambled access code in said receiving station.

8. A process as in claim 5 where said access code includes a list of at least part of a plurality of authorized services, said transmitted data including all of said services each prefaced with a service identification code including the step of comparing said identification code with said list of authorized services.

9. A process as in claim 5 where said access code includes a service cutoff date including the step of receiving a system date and comparing it with said cutoff date.

* * * * *